Figure 4:
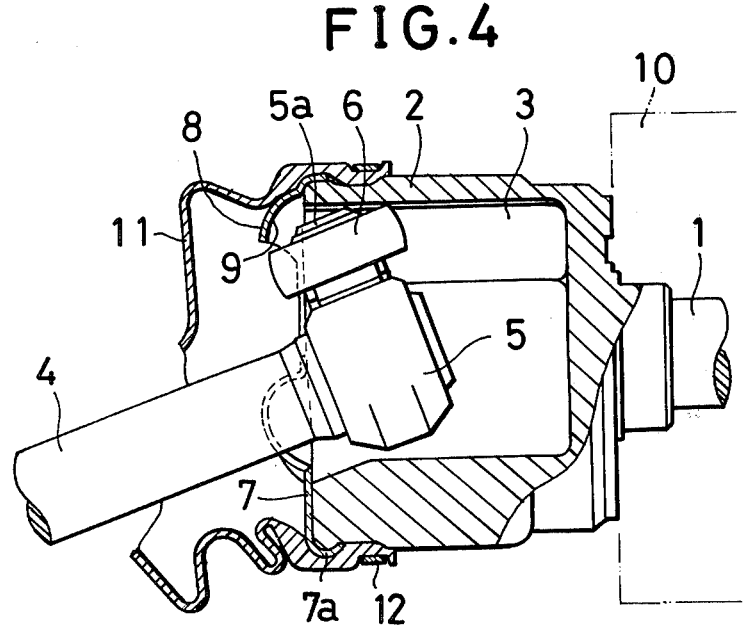

United States Patent [19]

Hirai et al.

[11] 4,196,598
[45] Apr. 8, 1980

[54] APPARATUS FOR PREVENTION OF THE REMOVAL OF A UNIVERSAL JOINT

[75] Inventors: Seiichi Hirai, Saitama; Nobuyuki Otsuka, Kawagoe, both of Japan

[73] Assignee: Honda Giken Kogyo Kabushiki Kaisha, Tokyo, Japan

[21] Appl. No.: 919,749

[22] Filed: Jun. 27, 1978

[30] Foreign Application Priority Data

Jul. 1, 1977 [JP] Japan ............................. 52/86098[U]

[51] Int. Cl.² .............................................. F16D 3/30
[52] U.S. Cl. ........................................ 64/32 R; 64/21
[58] Field of Search ..................... 64/21, 8, 32 R, 32 F

[56] References Cited

U.S. PATENT DOCUMENTS

| | | | |
|---|---|---|---|
| 3,133,432 | 5/1964 | Mazziotti | 64/21 |
| 3,362,192 | 1/1968 | Orain | 64/21 |
| 3,464,232 | 9/1969 | Hutchinson | 64/21 |
| 3,643,468 | 2/1972 | Kleinschmidt | 64/8 |
| 3,664,152 | 5/1972 | Mocielinski | 64/21 |
| 3,745,789 | 7/1973 | Orain | 64/21 |
| 3,757,534 | 9/1973 | Orain | 64/21 |
| 3,875,762 | 4/1975 | Tampalini | 64/21 |
| 4,012,924 | 3/1977 | Krude | 64/21 |
| 4,083,202 | 4/1978 | Westercamp | 64/32 R |

FOREIGN PATENT DOCUMENTS 789014   1/1958  United Kingdom .
1108816  4/1968  United Kingdom .
1105579  6/1968  United Kingdom .

Primary Examiner—Charles J. Myhre
Assistant Examiner—R. C. Turner
Attorney, Agent, or Firm—Haseltine, Lake & Waters

[57] ABSTRACT

The apparatus prevents the unintentional removal of a universal joint of the type where a tubular outer member is provided on an end portion of a shaft. In this structure, plural longitudinal directional sliding grooves are arranged in parallel one with another and an inner member provided on an end portion of another shaft is provided with plural spherical surface members. These may be spherical surface rollers, balls or the like. The respective spherical surface members are in slidable engagement with associated sliding grooves. An open end of the outer member has an annular closure member and is provided with concave portions facing the respective spherical surface members in the sliding grooves. The inner surfaces are formed into spherical surfaces substantially in conformity with the spherical surfaces of the spherical surface members.

7 Claims, 5 Drawing Figures

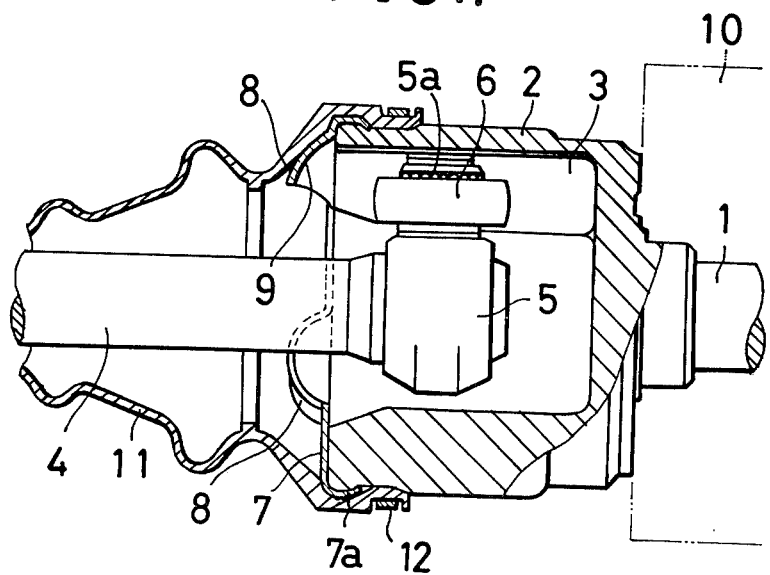
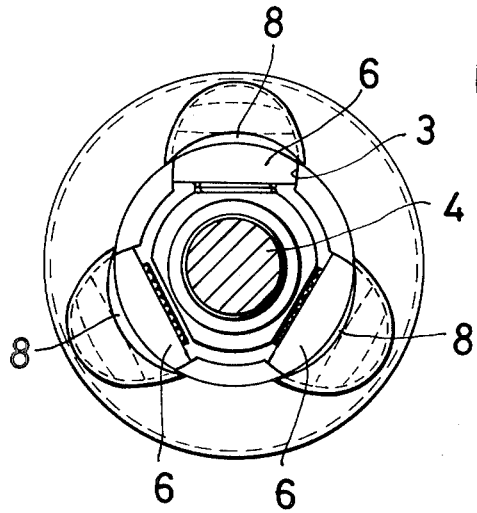
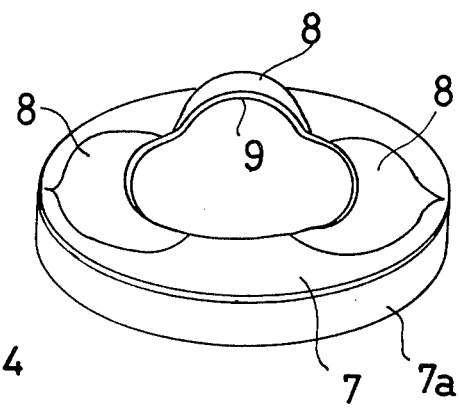

APPARATUS FOR PREVENTION OF THE REMOVAL OF A UNIVERSAL JOINT

BACKGROUND OF INVENTION

This invention relates to an apparatus preventing the removal of a slidable type constant velocity universal joint applied chiefly to an input side of a wheel driving a shaft used in a motorcar.

For a universal joint of this kind, there has been hitherto known that in such types of joints a tubular outer member is provided on an end portion of a shaft having a plurality of longitudinal directional sliding grooves arranged in parallel relation one with respect to another. An inner member is provided on an end portion of another shaft and is provided with plurality of spherical surface members such as spherical surface rollers, balls or the like. The respective spherical surface members are in slidable engagement with the respective sliding grooves. Additionally, an arrangement of the aforementioned type has been formed wherein an open end of the outer member is formed with an annular closure member for preventing the respective spherical surface members from coming off. In this case, the closure member is usually of such a type that the same is formed, at its positions facing the respective spherical surface members in the respective sliding grooves, with respective cut-out portions each of a width somewhat smaller than the diameter of each spherical surface member.

This type of arrangement, however, is so defective that the respective spherical members are liable to get bruised at the surfaces by the edge portions of the cut-out portions. This is so since they are brought into contact with the cut-out portions and additionally, in the case where the cut-out portions and additionally, in the case where the cut-out portions are large in width and especially in the case where the closure member is made of a sheet metal, the respective cut-out portions are liable to be damaged as a result of being spread by force produced as they are brought into contact with the spherical surface members.

SUMMARY OF INVENTION

The main object of the present invention is to provide an apparatus free from defects of the prior art.

Another object is to provide a universal joint which will not disengage.

The principal features of an invention are directed to an apparatus for the prevention of the unintentional removal of a universal joint having a tubular outer member disposed on an end portion of first shaft means said member having a plurality of longitudinal directional sliding grooves in parallel relationship, an inner member provided on second shaft means in axial alignment with said first shaft means having a plurality of spherical members being in slidable association with said grooves, wherein said outer member being formed with an annular closure member having concave wall surface proximate to said spherical members and inner surfaces thereof being formed of spherical surfaces in conformance with corresponding surface formed of said spherical members.

IN THE DRAWINGS

Figure 5:
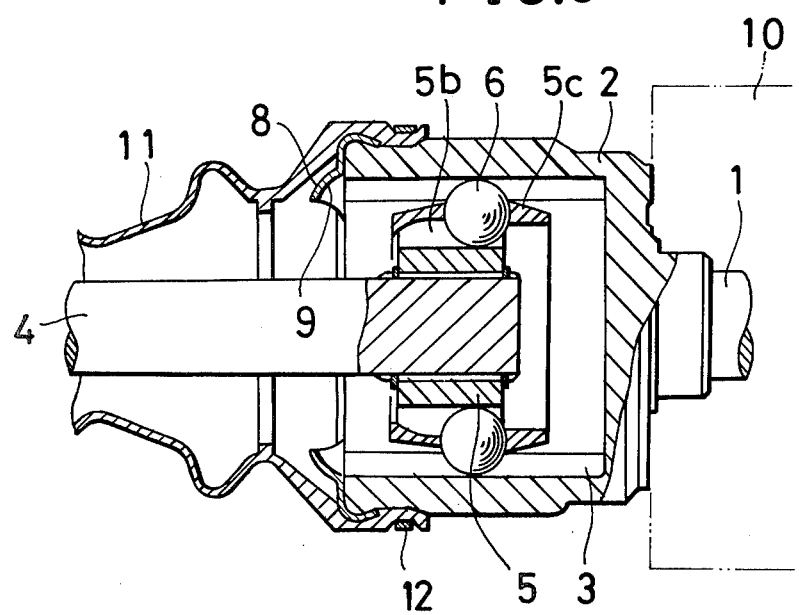

FIG. 1 is a sectional side view of one example of a universal joint having this invention apparatus, FIG. 2 is a sectional front view of an important section thereof, FIG. 3 is a perspective view of a closure member of the same, FIG. 4 is a sectional side view of the joint for explaining the operation thereof and FIG. 5 is a sectional side view of a modified example thereof.

DISCUSSION OF INVENTION

In a universal joint of the type the present invention employs a tubular outer member 2 is provided on an end portion of a shaft 1 with plural longitudinal directional sliding grooves arranged in parallel one with another, and an inner member 5 provided on an end portion of another shaft 4 being provided with plural spherical surface members 6 such as spherical surface rollers, balls or the like. The respective spherical surface members 6 are in slidable engagement with the respective sliding grooves 3, and is characterized in that an open end of the outer member 2 has an annular closure member 7 for preventing its removal. The closure member 7 is provided with respective concave portions 8 facing the respective spherical surface members 6 in the respective sliding grooves 3, and respective inner surfaces 9 are formed into spherical surfaces which are substantially in conformity with the spherical surfaces of the spherical surface members 6.

In the illustrated embodiments, the shaft 1 is an output shaft of a power transmission mechanism 10 and the shaft 2 is a wheel driving shaft connected to a wheel (not illustrated). In ordinary operation, the tow shafts 1,4 are on the same axis line as shown, for instance, in FIGS. 1, 5; there is however, a mutual bending between the two shafts 1, 2 as shown, and in FIG. 4 by upward and downward movement of the wheel or the turning movement thereof during the steering operation.

The closure member 7 is made of sheet of metal, for instance, and the respective concave portions 8 are formed integrally therewith by a pressing process. The member 7 has mounted a projecting flange 7a at its periphery on the open end of the outer member 2 and is detachably fixed thereto, together with an outer periphery dustproof member 11, and an outer peripheral band 12.

In the embodiment shown in FIGS. 1 to 4, the universal joint is of a tripod type and in the embodiment shown in FIG. 5, is of a double offset type. In the case of the tripod type, the respective spherical surface members 6 are composed of spherical surface rollers. These rollers are mounted rotatably and slidably on trunnion shaft 5a projecting from the inner member 5. In the case of the double offset type, the respective spherical surface members 6 are composed of balls and these are mounted on respective grooves 5b made in the inner member 5 and are supported by an outer periphery cage member 5c.

PREFERRED EMBODIMENT

In an ordinary situation, the respective spherical surface members 6 are located at nearly the respective middle portions within the respective sliding grooves 3 as shown in FIGS. 1, 5. On the occasion when the two shafts 1, 2 are bent one to another, the spherical surface member 6 on one side is slid to move in the sliding groove 3 towards the outer end. On reaching its outer end position, the same strikes against the facing inner surface 9 of the concave portion 8 of the closure member 7, so that the same is prevented from coming off.

Thus, according to this invention, the closure member 7 is formed with the respective concave portions 8 facing the respective spherical surface members 6; the respective inner surfaces thereof, are formed into such spherical surfaces that are substantially in conformity with the respective spherical surfaces of those members 6. It follows that the respective members 6, on their slide movements towards the outer ends, are in spherical surface contact extending over comparatively large areas with the respective inner surfaces 9. Thus the various inconveniences liable to be caused in the foregoing conventional arrangements having cut-out portions can be prevented and the apparatus can be used efficiently for a long period.

Many modifications and variations of the present invention are possible in light of the above teachings. It is, therefore, to be understood that within the scope of the appended claims, the invention may be practiced otherwise than as particularly described.

We claim:

1. An apparatus for the prevention of the unintentional removal of a universal joint having a tubular outer member disposed on an end portion of first shaft means said member having a plurality of longitudinal directional sliding grooves in parallel relationship, an inner member provided on second shaft means in axial alignment with said first shaft means having a plurality of spherical members being in slidable association with said grooves, wherein said outer member being formed with an annular closure member having concave wall surfaces proximate to said spherical members, and inner surfaces thereof being formed on spherical surfaces in conformance with corresponding being comprised of sheet metal, and said concave wall surface being pressed in said sheet metal integral with said closure member being formed by pressing integrally with the sheet metal.

2. An apparatus as defined in claim 1 wherein said concave wall surface is in contact with a spherical member when the spherical member is moved by sliding to the outer end of a sliding groove, said spherical members being spherical surface rollers, said universal joint being a tripod type; said spherical members being disposed centrally within said sliding grooves.

3. An apparatus as claimed in claim 1, wherein: said spherical members are spherical surface rollers.

4. An apparatus as claimed in claim 1, wherein: said spherical members are balls.

5. An apparatus as claimed in claim 1, wherein: said universal joint is a tripod type.

6. An apparatus as claimed in claim 1, wherein: said universal joint is a double offset type.

7. An apparatus as claimed in claim 1, wherein: said spherical members being disposed centrally within said sliding grooves.

* * * * *